United States Patent
Pierce et al.

(10) Patent No.: US 11,155,070 B2
(45) Date of Patent: Oct. 26, 2021

(54) PREPREG DEBACKER AND METHOD OF LAYUP

(71) Applicant: 7260297 Manitoba Ltd., Winnipeg (CA)

(72) Inventors: Braden Pierce, Headingley (CA); Derek Schroen, Loretta (CA); Paul Card, Winnipeg (CA)

(73) Assignee: 7260297 Manitoba Ltd., Winnipeg (CA)

( * ) Notice: Subject to any disclaimer, the term of this patent is extended or adjusted under 35 U.S.C. 154(b) by 0 days.

(21) Appl. No.: 16/825,976

(22) Filed: Mar. 20, 2020

(65) Prior Publication Data
US 2020/0298547 A1   Sep. 24, 2020

Related U.S. Application Data

(60) Provisional application No. 62/821,323, filed on Mar. 20, 2019.

(51) Int. Cl.
*B32B 43/00* (2006.01)
*B32B 38/10* (2006.01)
*B65H 41/00* (2006.01)

(52) U.S. Cl.
CPC ......... *B32B 38/10* (2013.01); *B32B 43/006* (2013.01); *B65H 41/00* (2013.01);
(Continued)

(58) Field of Classification Search
CPC . B32B 38/10; B32B 43/006; Y10T 156/1132; Y10T 156/1137;
(Continued)

(56) References Cited

U.S. PATENT DOCUMENTS 6,500,298 B1 * 12/2002 Wright ............... B29C 63/0013
156/708
8,298,359 B2   10/2012 Imparato et al.
(Continued)

FOREIGN PATENT DOCUMENTS

| DE | 29604938 U1 | 7/1996 |
| GB | 2490152 A | 10/2012 |
| JP | 2001286909 A | 10/2001 |

OTHER PUBLICATIONS

Bjornsson, A., Jonsson, M., Eklund, D., Lindback J.E., Bjorkman, M., "Getting to grips with automated prepreg handling", Aug. 17, 2017, Prod. Eng. Res. Devel. 11, 445-453.

(Continued)

*Primary Examiner* — Mark A Osele
*Assistant Examiner* — Nickolas R Harm
(74) *Attorney, Agent, or Firm* — Finch & Maloney, PLLC; Michael J. Bujold; Jay S. Franklin

(57) ABSTRACT

A method of removing backing film from a sheet element is provided. The sheet element has a preimpregnated layer, and sheets of backing film are adhered to the top and bottom of the preimpregnated layer. The backing film has a different coefficient of thermal expansion than the preimpregnated layer, and a plane of the sheet element is defined by the peripheral edge. A shear strain is created between the backing films and the preimpregnated layer by cooling the sheet element. A fluid stream is directed at a portion of the peripheral edge, the fluid stream being directed in the plane of the sheet element. The fluid stream causes the backing films to separate from the top and bottom of the preimpregnated layer. A differential pressure is simultaneously applied (Continued)

to the backing films relative to the fluid stream to cause the backing films to be removed from the preimpregnated layer.

6 Claims, 7 Drawing Sheets

(52) U.S. Cl.
CPC . *B65H 2301/5112* (2013.01); *Y10T 156/1132* (2015.01); *Y10T 156/1137* (2015.01); *Y10T 156/1142* (2015.01); *Y10T 156/1153* (2015.01); *Y10T 156/1174* (2015.01); *Y10T 156/1189* (2015.01); *Y10T 156/1911* (2015.01); *Y10T 156/1939* (2015.01); *Y10T 156/1944* (2015.01); *Y10T 156/1956* (2015.01)

(58) Field of Classification Search
CPC ......... Y10T 156/1142; Y10T 156/1153; Y10T 156/1174; Y10T 156/1189; Y10T 156/1939; Y10T 156/1944; Y10T 156/1956; Y10T 156/1911
See application file for complete search history.

(56) References Cited

U.S. PATENT DOCUMENTS

| | | | |
|---|---|---|---|
| 8,366,874 | B2 | 2/2013 | Meloni |
| 9,358,770 | B2 | 6/2016 | Dong et al. |
| 9,517,615 | B2 | 12/2016 | Dong et al. |
| 9,757,906 | B2 | 9/2017 | Charles |
| 2016/0346959 | A1 | 12/2016 | Corden et al. |
| 2017/0057195 | A1 | 3/2017 | Blom et al. |

OTHER PUBLICATIONS

Bjornsson, A., Lindback, J.E., Johansen, K., "Automated Removal of Prepreg Backing Paper—A Sticky Problem", 2013, Proceedings of the SAE 2013, Aerotech Congress and Exhibition.

Nilakantan, G., Olliges, R., Su, R., Nutt, S., "Reuse Strategies for Carbon Fiber-Epoxy Prepreg Scrap", 2016, Conference proceedings: Composites and Advanced Materials Exposition (CAMX) 2014.

* cited by examiner

PREPREG DEBACKER AND METHOD OF LAYUP

TECHNICAL FIELD

This relates to installing preimpregnated reinforcing materials ("prepreg material"), and in particular, methods of removing backer material prior to installation, and methods of laying up the debacked prepreg material.

BACKGROUND

Preimpregnated reinforcing materials, commonly referred to as prepreg materials, such as fibre glass sheets, are commonly used in manufacturing reinforced structures prior. Prepreg materials typically include a fibre layer that is impregnated with a resin. The prepreg material is typically covered top and bottom by a backing film that prevent contamination, unintentional adhesion to other sheets or the surroundings, and makes it easier to store and handle the prepreg material. Prior to installation, the backing film must be removed from the prepreg material. U.S. Pat. No. 9,358,770 (Dong et al.) entitled "System and method for automated initial separation of composite ply backing" teaches one method of separating the backing film from the preimpregnated layer prior to installation of the material.

The prepreg material is impregnated with resin because this allows it to be moldable or bendable until it is cured, at which point it becomes a rigid material that is reinforced by the embedded fibers. Because the uncured prepreg material is moldable, it is well suited to being installed on rounded surface, irregular shapes, around corners, etc. and holds that shape after being cured. However, as the surfaces on which the prepreg material are installed may be non-flat or non-rectangular, the prepreg material must be cut to a suitable size and shape to avoid wrinkles and ensure the surface being reinforced is properly covered. This process often results in a significant amount of wasted material. U.S. Pat. No. 9,757,906 (Charles) entitled "Method of Making Composite Charges" describes a method of laying up precut shapes of prepreg material that uses predetermined shapes to reduce the amount of wasted material

SUMMARY

According to an aspect, there is provided a method of removing backing film from a sheet element of preimpregnated material, the sheet element comprising a top face, a bottom face, and a peripheral edge, and sheets of backing film adhered to each of the top face and the bottom face of the sheet element, the backing film having a different coefficient of thermal expansion than the sheet element, a plane of the sheet element being defined by the peripheral edge, the method comprising the steps of creating a shear strain between the backing films and the sheet element by cooling the sheet element, directing a fluid stream at a portion of the peripheral edge, the fluid stream having an average vector that is in the plane of the sheet element, the fluid stream causing the backing films to separate from the top face and the bottom face of the sheet element at the portion of the peripheral edge, and simultaneously applying a differential pressure to the backing films on each of the top face and the bottom face of the sheet element relative to the fluid stream to cause the backing films to be removed from the sheet element.

According to other aspects, the sheet element may be cooled by parallel cooling plates, parallel rollers may be used to move the sheet element through a debacking apparatus that engage the top face and the bottom of the sheet element, wherein the sheet element may be cooled and the backing film may be removed within the apparatus, the differential pressure may be applied along opposed channels that are at an angle relative to the plane of the sheet element, applying the differential pressure may comprise applying a vacuum to the opposed channels, and applying the differential pressure may comprise a pressure increase from the fluid stream.

According to an aspect, there is provided a debacking apparatus for removing backing film from a sheet element, the sheet element comprising a sheet element having a top face, a bottom face, and a peripheral edge, and sheets of backing film adhered to each of the top face and the bottom face of the sheet element, the backing film having a different coefficient of thermal expansion than the sheet element, a plane of the sheet element being defined by the peripheral edge, the apparatus comprising a body comprising a passage through which the sheet element passes, the portion of the body surrounding the passage comprising a sheet element receiving opening, one or more moving devices that applies a motive force to the sheet element to move the sheet element along the length of the passage, a cooling element configured to cool the sheet element sufficiently to create a shear strain between the backing films and the sheet element, a source of fluid and a fluid stream directing element, the fluid stream directing element being positioned to direct a fluid stream at a portion of the peripheral edge, such that the fluid stream has an average vector that is in the plane of the sheet element and the fluid stream causes the backing films to separate from the top face and the bottom face of the sheet element at the portion of the peripheral edge, a source of a differential pressure, the differential pressure being directed to simultaneously apply a differential pressure to the backing films on each of the top face and the bottom face of the sheet element relative to the fluid stream, such that the backing films are removed from the sheet element, backing film receptacles that receive the removed backing films, and a sheet element ejecting opening.

According to other aspects, the cooling element may comprise parallel cooling plates, the moving devices may comprise parallel rollers, the parallel rollers engaging the top face and the bottom face of the sheet element, the source of differential pressure may comprise opposed channels that are at an angle relative to the plane of the sheet element, the source of differential pressure may further comprise a vacuum applied to the opposed channels, and the source of differential pressure further may comprise a portion of the fluid stream positioned to provide a pressure increase.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
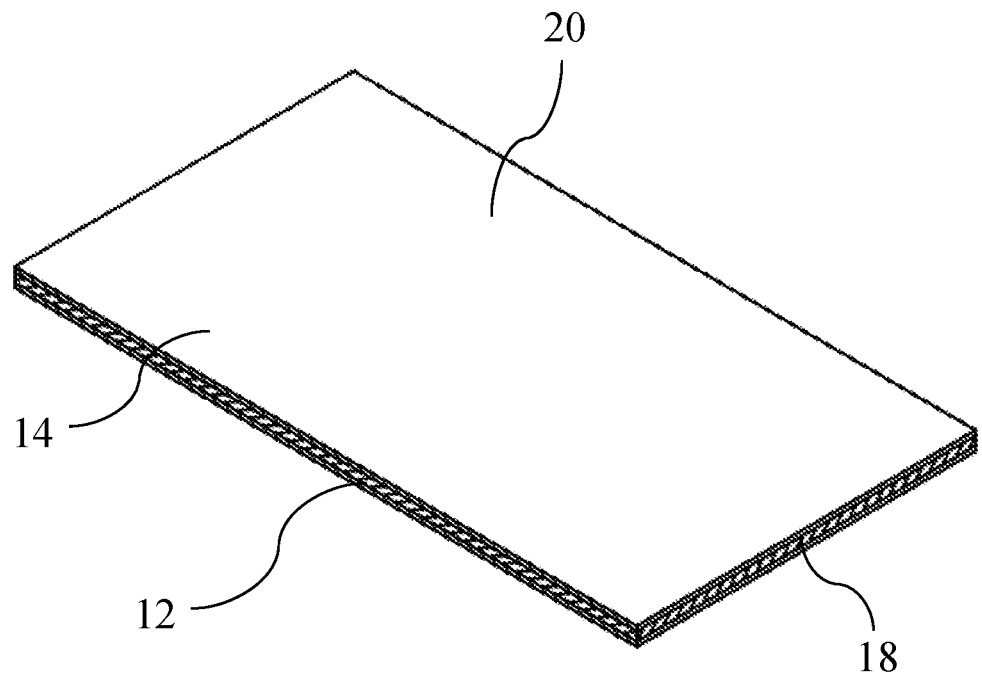
FIG. 1 is a perspective view of a sheet element.

A debacking apparatus, generally identified by reference numeral 22, will now be described with reference to FIG. 1 through 8.

Figure 2:
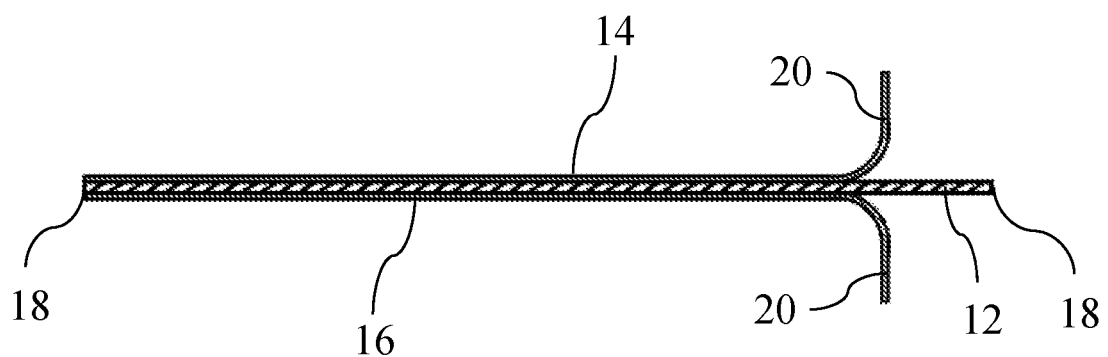
FIG. 2 is a side elevation view of a sheet element with backing film partially removed from either side of a sheet element formed from preimpregnated material.

Referring to FIG. 1 and FIG. 2, a sheet element 12 is shown. Sheet element 12 has a top face 14, a bottom face 16, and a peripheral edge 18. Sheets of backing film 20 are adhered to each of top face 14 and bottom face 16 of sheet element 12. Sheets of backing film 20 have a different coefficient of thermal expansion than sheet element 12. A plane of sheet element 12 is defined by peripheral edge 18 of sheet element 12. It will be understood that sheet element 12 will typically be a composite reinforcing material, such as fibre glass, that has been preimpregnated with a curable resin. The materials used to form these types of materials are well known in the industry, and will not be described further.

As shown in FIG. 1, sheet element 12 has a rectangular shape. The method and apparatus described herein will be given in the context of sheet elements 12 that are regularly sized and shaped, such as may be used in a modular layup procedure. The present discussion may also be applied more broadly to more randomly shaped sheet elements 12, although other factors, such as orientation of the leading edge, size of sheet elements 12, etc. may need to be accounted for, as will be recognized.

Figure 3:
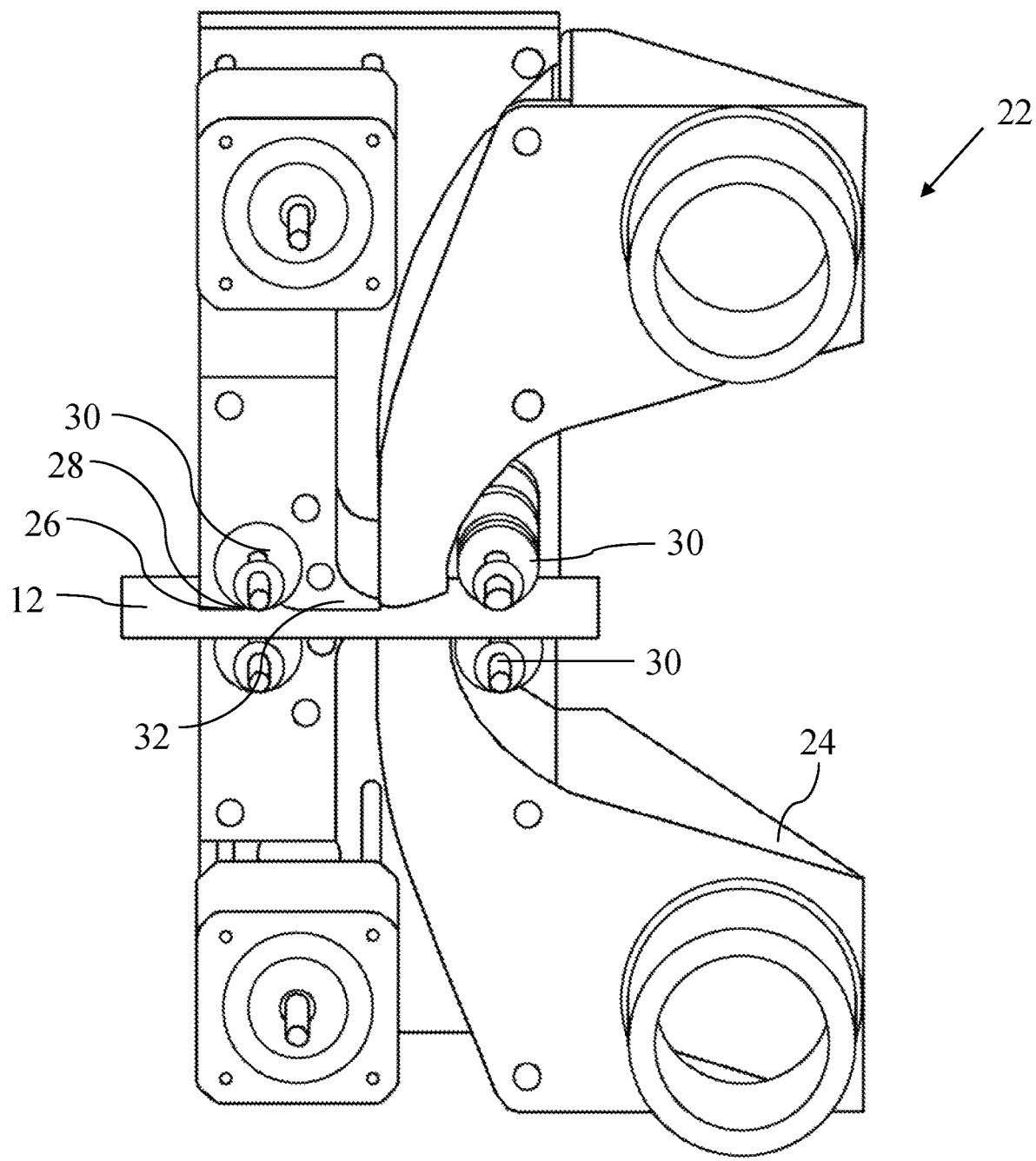
FIG. 3 is a perspective view of a debacking apparatus.

Referring to FIG. 3, a debacking apparatus 22 for removing backing film 20 from sheet element 12 is shown. Debacking apparatus 22 has a body 24 with a passage 26 along which sheet element 12 passes.

Figure 4:
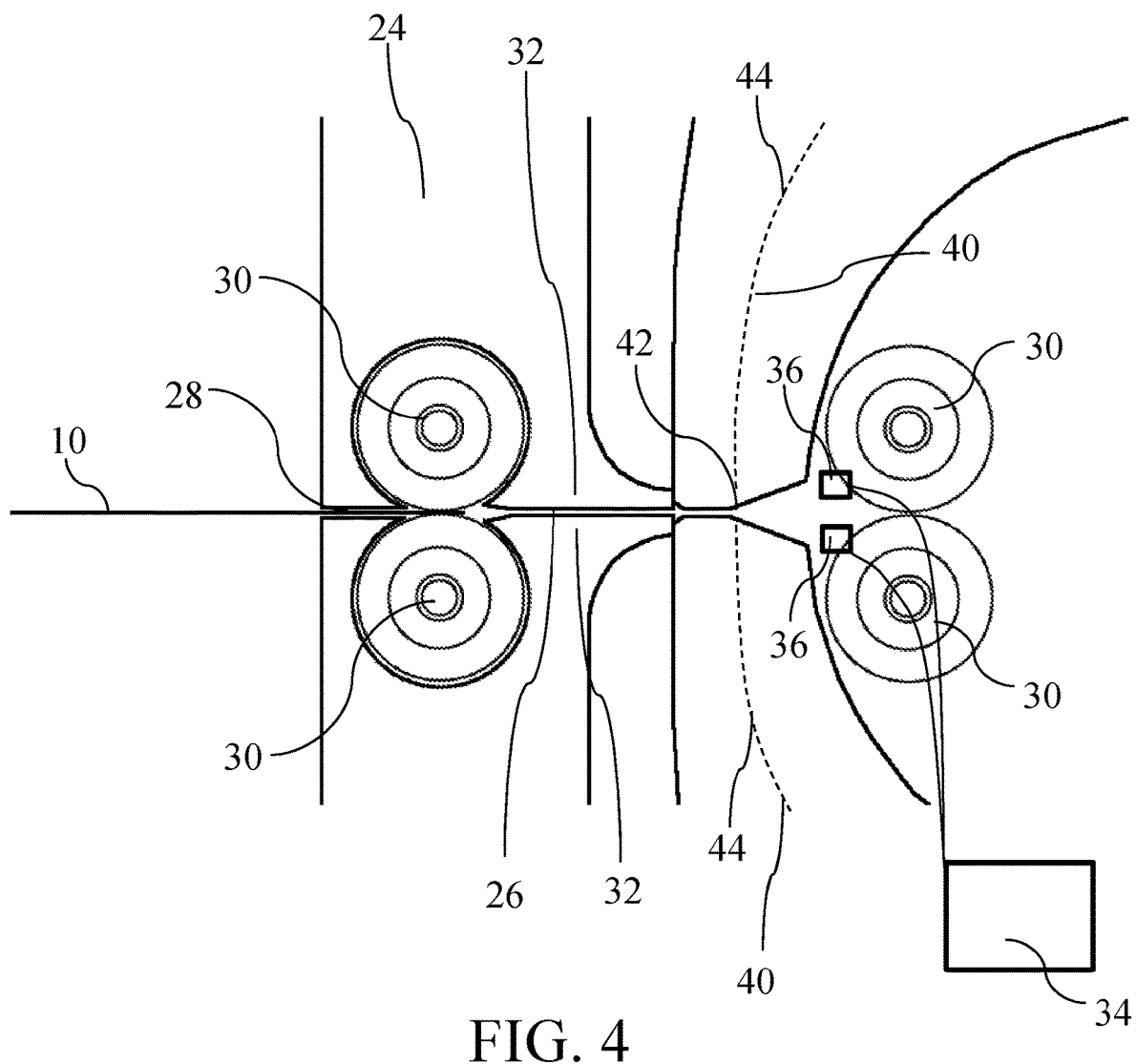
FIG. 4 is a detailed side elevation view of a portion of a debacking apparatus with a sheet element in a first position.

Referring to FIG. 4, sheet element 12 first enters passage 26 of device 22 via a passage opening 28. One or more moving devices 30 apply a motive force to sheet element 12 to move sheet element 12 along the length of passage 26. As shown, moving devices 30 are parallel rollers positioned within body 24 that engage top face 14 and bottom face 16 of sheet element 12 after sheet element 12 enters passage 26. It will be understood that other methods may be used as are known in the art to move flat sheets along passage 26. For example, rather than using internal rollers, moving devices 30 may be external and prior to opening 28, may be grippers that move linearly, etc. A cooling element 32 is used to cool sheet element 12 sufficiently after entering passage 26 that a shear strain is created between the backing films 20 and sheet element 12. Cooling element 32 may, for example, be parallel cooling plates, jets of cool air, a source of vacuum, streams of liquid carbon dioxide, compressed gas, chilled fluid, cooled rollers 30, or use other techniques as will be recognized by those skilled in the art. The shear strain induced in sheet element 12 occurs due to the difference in the coefficients of thermal expansion between backing film 20 and sheet element 12, which cause backing film 20 and preimpregnated material 12 to contract or expand at different rates in response to the temperature change. In addition, as sheet element 12 is cooled, the resin will typically stiffen, and the adhesion of the resin will be reduced, making it easier to remove backing film 20 from sheet element 12. Cooling element 32 may cool sheet element 12 as it progresses along passage 26. Alternatively, cooling element 32 may be configured to simultaneously cool the entire sheet element 12 once it has entered passage 26. The particular design may depend on the type of cooling element 32 used, the time required to cool sheet element 12 sufficiently, the expected size of sheet element 12, etc. The purpose of cooling sheet element 12 is cooled sufficient to produce a sufficient strain between backing films 20 and the resin in sheet element 12 that backing film 20 is able to separate from sheet element 12. The cooling may also result in a reduced adhesion between the resin in sheet element 12 and backing films 20, which may occur at a sufficiently low temperature, such as the glass transition temperature of the resin, or any other suitable temperature that allows films 20 to be separated from sheet element 12.

Figure 6:
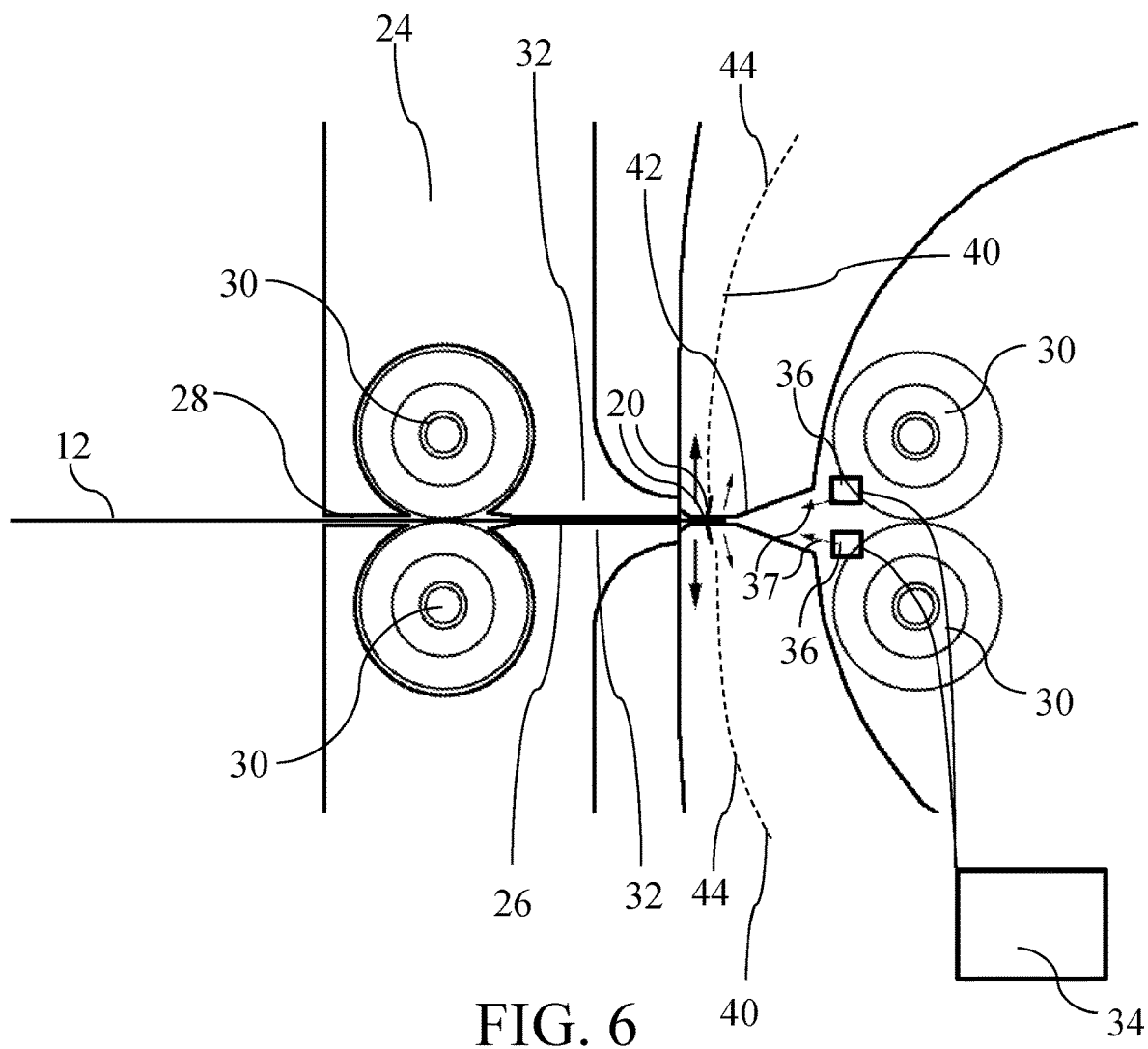
FIG. 6 is a detailed side elevation view of a portion of a debacking apparatus with a sheet element in a third position.

Referring to FIG. 6, once sheet element 12 has been sufficiently cooled, the removal of backing films 20 is started by directing a fluid stream 37 at a leading edge 18 of the peripheral edge of sheet element 12. Fluid stream 37, as depicted, may be the result of a source of fluid 34 connected to nozzles 36 are used. Nozzles 36 may take any suitable shape or configuration that are able to direct a suitable stream of fluid. For example, there may be one or more nozzles 36. If one nozzle, nozzle 36 will generally be positioned and oriented in line with the plane of sheet element 12. However, as this position may interfere with the path of sheet element 12 toward the next set of rollers 30, nozzles 36 are preferably spaced above and below the intended path of sheet element 12, which results in an average vector in the plane of sheet element 12, and immediately opposite the direction of travel of sheet element 12. To ensure fluid stream 37 acts sufficiently on the leading edge of sheet element 12, nozzles 36 may have an elongated opening that generates a laminar flow along the leading edge 18 of sheet element 12. The resulting fluid stream 37 preferably acts upon the entire leading edge 18, but may also be a portion, if such is determined to be sufficient. Alternatively, there may be multiple nozzles 36 spaced along the width of the leading edge of sheet element 12, either to approximate a laminar flow, or to act on a sufficient portion of the leading edge to begin the separation of film 20 from sheet 12. Nozzles 36 as shown are positioned on the other side of cooling element 32 from opening 28, such that fluid stream 37 encounters sheet 12 as it exits the cooling section of passage 26. The combination of shear strain, reduced adhesion, and the impact of fluid stream 37 on peripheral edge 18 where the edges of backing film 20 and sheet element 12 meet causes the backing films 20 to separate from top face 14 and bottom face 16 of sheet element 12 at the portion of peripheral edge 18, as shown in FIG. 2. The initial separation may also be encouraged by inducing vibration in sheet element 12, as sheet element 12 may begin to vibrate similar to a reed in a wind instrument, which induces the edges of backing films 20 to separate from sheet element 12.

Figure 7:
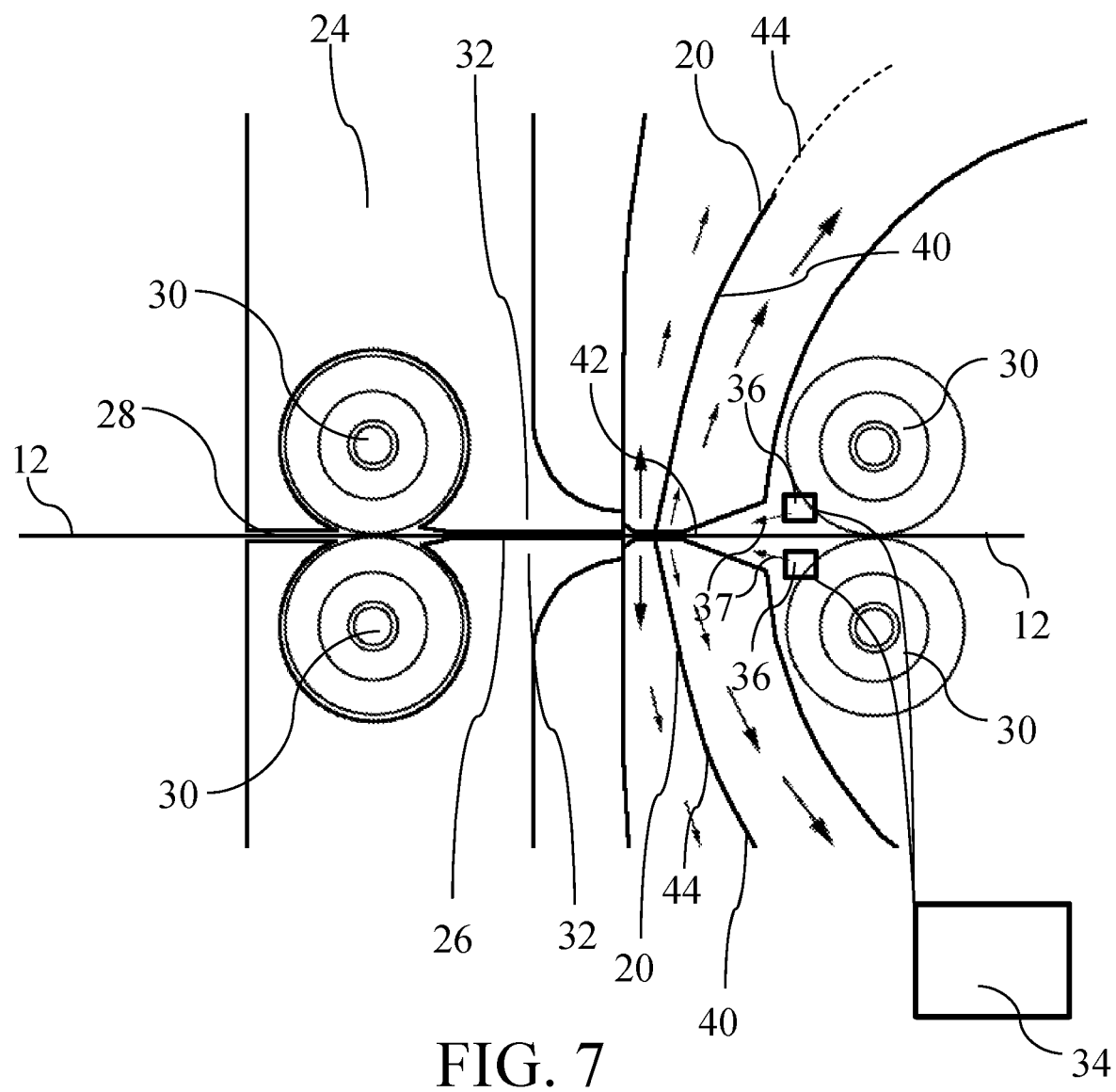
FIG. 7 is a detailed side elevation view of a portion of a debacking apparatus with a sheet element in a fourth position.
Figure 8:
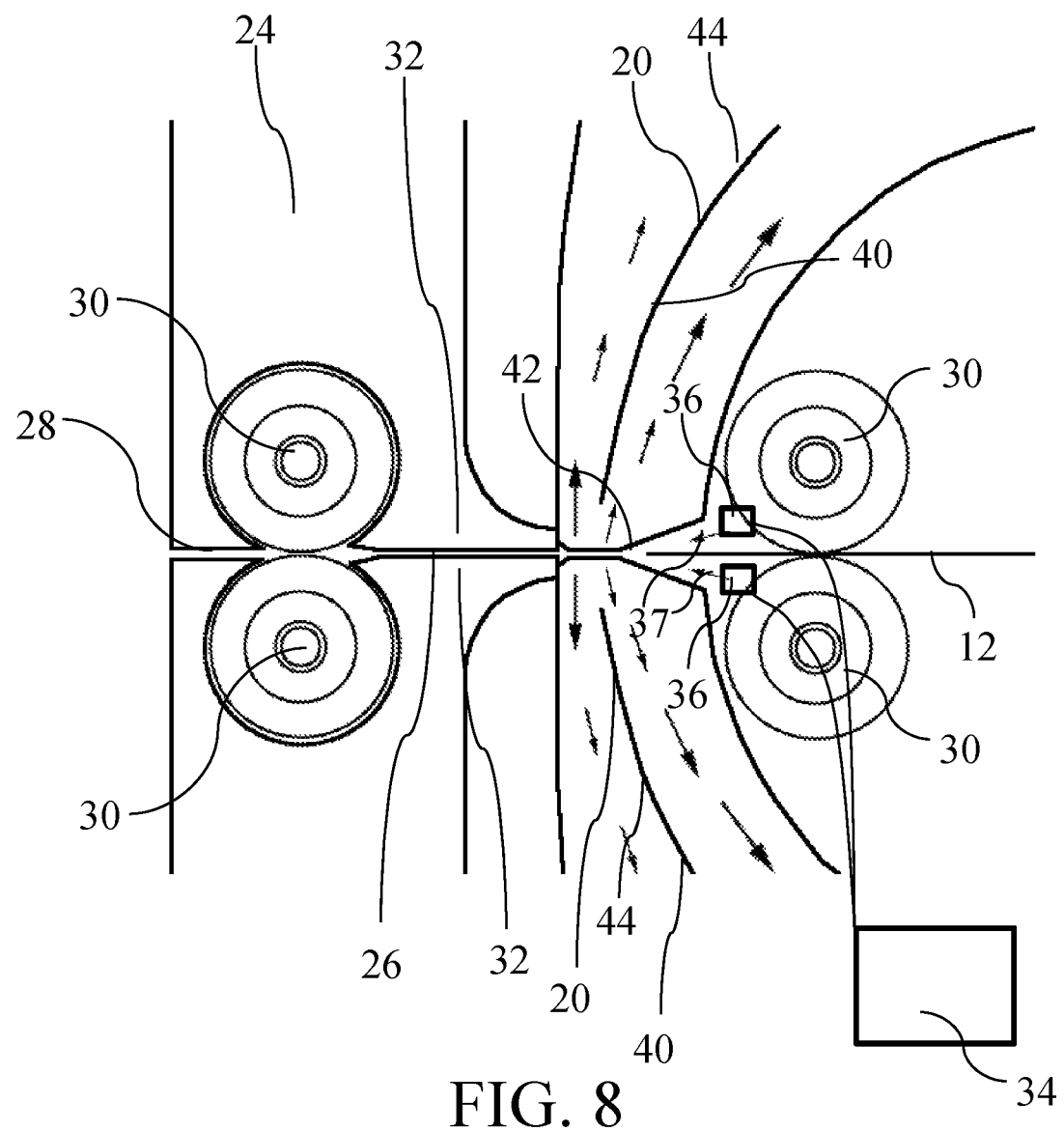
FIG. 8 is a detailed side elevation view of a portion of a debacking apparatus with a sheet element in a fifth position.

Referring to FIG. 6, sheet element 12 is acted upon by a differential pressure. The differential pressure is defined by a lower pressure in opposed channels 44 on either side of passage 26 relative to the pressure induced on sheet 12 by fluid streams 37. This differential pressure acts on backing film 20 to encourage backing film 20 to separate from sheet element 12. Once started, the combination of the differential pressure, and the continued pressure applied by fluid streams 37 causes backing film 20 to move away from sheet element 12. As shown, the differential pressure is directed to simultaneously apply a differential pressure to the backing films 20 on each of top face 14 and bottom face 16 of sheet element 12 relative to fluid stream 37 such that backing films 20 are removed from sheet element 12, as shown in FIG. 7 and FIG. 8. The source of the differential pressure may be configured to apply the pressure differential to a portion of sheet 12, or the pressure differential may be applied across the entire sheet 12. Backing film 20 is then received in backing film receptacles 40 and sheet element 12 is ejected through a sheet element ejecting opening 42, as shown in FIG. 8. Both layers of backing film 20 may be removed simultaneously without the requirement for any mechanical grasping and removal of backing film 20. In the depicted example, opposed channels 44 are at an angle relative to the plane of sheet element 12, as shown in FIG. 7. Opposed channels 44 may also act as the backing film receptacles 40. The differential pressure may be applied to backing film 20 by either applying a vacuum to opposed channels 44 to cause backing film 20 to move into and along them, or by increasing the pressure via fluid stream 37 and thereby increase the pressure relative to the pressure in channels 44, which results in an area of lower pressure, or a draft, flowing into channels 44. If a vacuum is applied, it may be unnecessary to continue to apply fluid stream 37 to sheet element 12 once backing films 20 have entered channels 44, although it may be easier to operate fluid streams 37 continuously.

Prior to entrance 28 of passage 26, or within passage 26, apparatus 22 may be provided with alignment features (not shown) to ensure that sheet element 12 enters or passes through passage 26 in the correct position and orientation. The alignment features may be low friction surfaces, rollers, belts, or combinations thereof. Apparatus 22 may also be provided with a vibration induction device (not shown) that induces vibrations in sheet element 12 after cooling and assists with generating shear forces between backing films 20 and sheet element 12.

Figure 5:
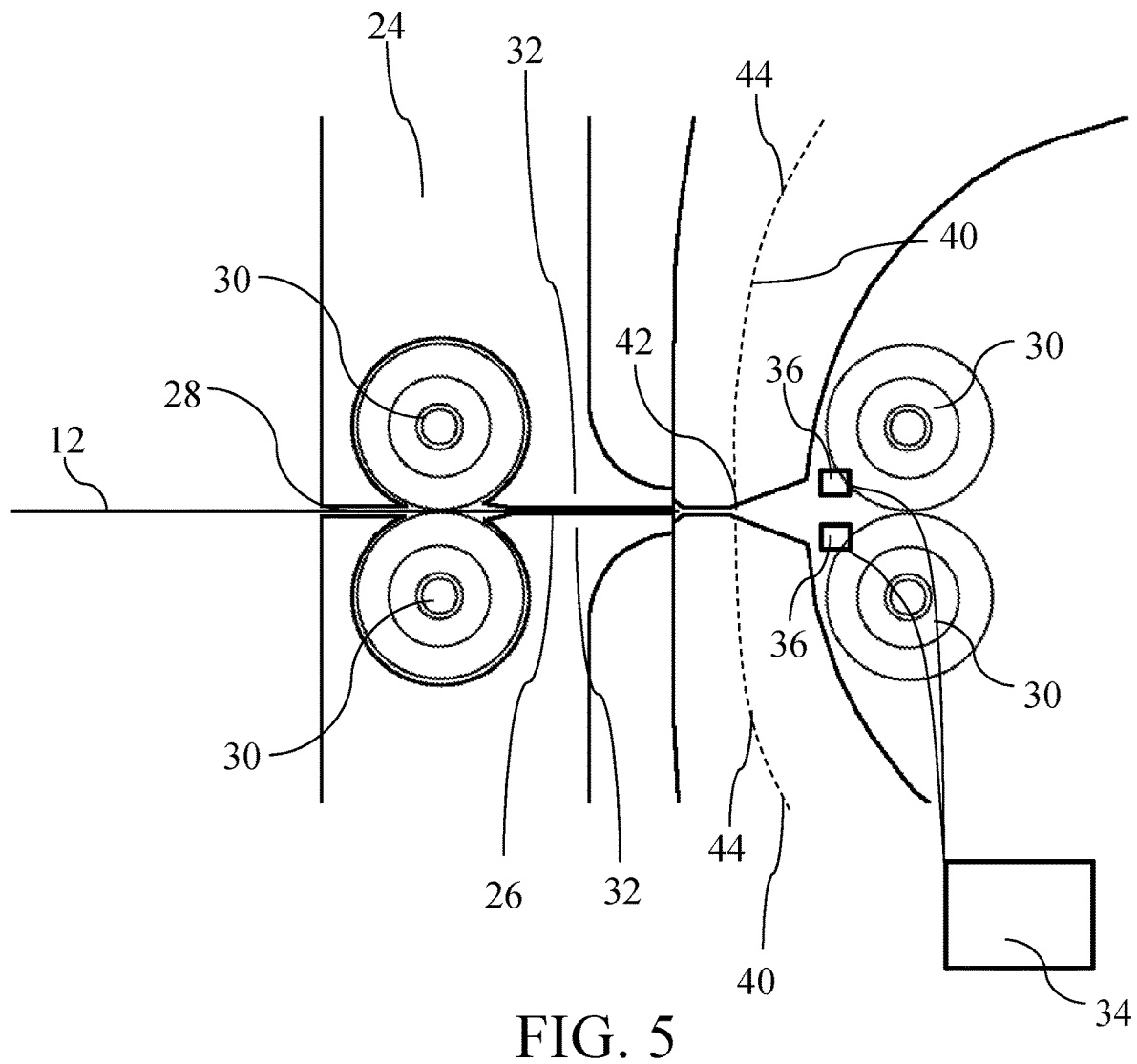
FIG. 5 is a detailed side elevation view of a portion of a debacking apparatus with a sheet element in a second position.

In broad terms, an example of a method of removing backing film 20 from a sheet element 12 may be described as follows. Referring to FIG. 5, sheet element 12 is cooled to create a shear strain between backing film 20 and sheet element 12. Referring to FIG. 6, a fluid stream 37 is directed at a portion of peripheral edge 18 to cause backing films 20 to separate from top face 14 and bottom face 16 of sheet element 12 at the portion of peripheral edge 18. As shown in FIG. 6 through FIG. 8, a differential pressure is simultaneously applied to backing films 20 on each of top face 14 and bottom face 16 of sheet element 12 relative to fluid stream 37 to cause backing films 20 to be removed from sheet element 12. As shown in FIG. 8, this results in the separation of backing films 20 and sheet element 12. Sheet element 12 may be exposed to a number of different forces during the removal process, allowing for backing film 20 to be removed without the requirement to manually separate and grasp backing film 20. Sheet element 12 may, for example, experience cooling induced shear, aerodynamic flutter, fluid shear, vacuum induced tensile forces, bending shear induced by oscillation, or some combination of these forces as backing film 20 is separated from sheet element 12.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of removing backing film from a sheet element of preimpregnated material, the sheet element comprising a top face, a bottom face, and a peripheral edge, and sheets of backing film adhered to each of the top face and the bottom face of the sheet element, the backing film having a different coefficient of thermal expansion than the sheet element, a plane of the sheet element being defined by the peripheral edge, the method comprising the steps of:

cooling the sheet element to create a shear strain between the backing films and the sheet element;

directing a fluid stream at a portion of the peripheral edge, the fluid stream having an average vector that is in the plane of the sheet element, the fluid stream causing the backing films to separate from the top face and the bottom face of the sheet element at the portion of the peripheral edge; and simultaneously applying a differential pressure to the backing films on each of the top face and the bottom face of the sheet element relative to the fluid stream to cause the backing films to be removed from the sheet element.

2. The method of claim 1, wherein the sheet element is cooled by parallel cooling plates.

3. The method of claim 1, wherein parallel rollers are used to move the sheet element through a debacking apparatus, the rollers engaging the top face and the bottom of the sheet element, wherein the sheet element is cooled and the backing film is removed within the debacking apparatus.

4. The method of claim 1, wherein the differential pressure is applied along opposed channels that are at an angle relative to the plane of the sheet element.

5. The method of claim 4, wherein applying the differential pressure comprises applying a vacuum to the opposed channels.

6. The method of claim 4, wherein applying the differential pressure comprises a pressure increase from the fluid stream.

\* \* \* \* \*